US010158272B2

(12) United States Patent
Noack et al.

(10) Patent No.: US 10,158,272 B2
(45) Date of Patent: Dec. 18, 2018

(54) ELECTRIC MACHINE WITH COMBINED AIR AND WATER COOLING

(71) Applicant: SIEMENS AKTIENGESELLSCHAFT, München (DE)

(72) Inventors: Felix Noack, Nürnberg (DE); Martin Sindelka, Nürnberg (DE); Sebastian Weiss, Oberasbach (DE)

(73) Assignee: Siemens Aktiengesellschaft, München (DE)

( * ) Notice: Subject to any disclaimer, the term of this patent is extended or adjusted under 35 U.S.C. 154(b) by 241 days.

(21) Appl. No.: 14/649,386

(22) PCT Filed: Nov. 27, 2013

(86) PCT No.: PCT/EP2013/074812
§ 371 (c)(1),
(2) Date: Jun. 3, 2015

(87) PCT Pub. No.: WO2014/086627
PCT Pub. Date: Jun. 12, 2014

(65) Prior Publication Data
US 2016/0204680 A1    Jul. 14, 2016

(30) Foreign Application Priority Data
Dec. 4, 2012    (EP) .................................... 12195465

(51) Int. Cl.
*H02K 9/14*    (2006.01)
*H02K 9/197*    (2006.01)
(Continued)

(52) U.S. Cl.
CPC ................ *H02K 9/14* (2013.01); *H02K 1/20* (2013.01); *H02K 9/08* (2013.01); *H02K 9/10* (2013.01); *H02K 9/19* (2013.01); *H02K 9/197* (2013.01)

(58) Field of Classification Search
CPC ............ H02K 9/00; H02K 9/005; H02K 9/04; H02K 9/10; H02K 9/12; H02K 9/16;
(Continued)

(56) References Cited

U.S. PATENT DOCUMENTS 1,700,840 A * 2/1929 Gay .................... F28D 15/0208
165/104.21
3,801,843 A * 4/1974 Corman .............. F28D 15/0275
165/104.25
(Continued)

FOREIGN PATENT DOCUMENTS

DE    1813190 U    6/1960
DE    1813190 A1    9/1969
(Continued)

OTHER PUBLICATIONS

Sebastian Weiss, U.S. Pat. No. 7,923,871, Apr. 12, 2011, 2009-0273246, Nov. 5, 2009.
(Continued)

*Primary Examiner* — Michael Andrews
*Assistant Examiner* — Alexander Singh
(74) *Attorney, Agent, or Firm* — Henry M. Feiereisen LLC

(57) ABSTRACT

An electric machine includes a housing having an air inlet opening near a front or rear end of the housing for aspirating air, and an air outlet opening for expelling air. The housing accommodates a stator, and a rotor is mounted in the housing for rotation about an axis of rotation. Mounted on a side of the housing in parallel relation to the axis of rotation is a
(Continued)

hood-like attachment to cover the air inlet and outlet openings so that air expelled from the housing through the air outlet opening is fed back to the air inlet opening. Disposed in the stator are pipes for flow of a liquid cooling medium to directly cool the stator during operation. At least some of the pipes project beyond the stator toward the front and rear ends, so that during operation heat is removed by the pipes from air flowing in the housing.

11 Claims, 3 Drawing Sheets

(51) Int. Cl.
*H02K 1/20* (2006.01)
*H02K 9/08* (2006.01)
*H02K 9/10* (2006.01)
*H02K 9/19* (2006.01)

(58) Field of Classification Search
CPC .. H02K 9/18; H02K 9/19; H02K 9/22; H02K 9/197; H02K 9/08; H02K 9/06; H02K 9/14; H02K 1/20
USPC ............... 310/58, 52, 53, 54, 55, 56, 57, 59
See application file for complete search history.

(56) References Cited

U.S. PATENT DOCUMENTS

| | | | | |
|---|---|---|---|---|
| 5,557,153 | A * | 9/1996 | Zimmermann | H02K 9/26 310/56 |
| 8,405,262 | B1 * | 3/2013 | Beatty | H02K 1/20 310/58 |
| 2008/0030086 | A1 | 2/2008 | Yoshitaka | |
| 2011/0133580 | A1 * | 6/2011 | Sugimoto | H02K 1/20 310/54 |
| 2012/0286597 | A1 * | 11/2012 | Gundtoft | H02K 3/24 310/59 |

FOREIGN PATENT DOCUMENTS

| | | |
|---|---|---|
| DE | 3724186 A1 | 1/1989 |
| DE | 19716758 A1 | 10/1998 |
| EP | 0623988 A2 | 11/1994 |
| EP | 1248349 A2 | 10/2002 |
| EP | 2109207 A2 | 10/2009 |
| EP | 2518868 A1 | 10/2012 |
| RU | 2095921 C1 | 11/1997 |
| RU | 113891 U1 | 2/2012 |
| WO | WO 1998/054819 A1 | 12/1998 |
| WO | WO 2012159660 A2 | 11/2012 |

OTHER PUBLICATIONS

Sebastian Weiss, U.S. Pat. No. 8,026,643, Sep. 27, 2011, 2009-0230790, Sep. 17, 2009.
Sebastian Weiss et al., U.S. Pat. No. 8,283,817, Oct. 9, 2012, 2011-0006622, Jan. 13, 2011.
Thomas Hümer et al., U.S. Pat. No. 8,405,261, Mar. 26, 2013, 2011-0031831, Feb. 10, 2011.
Benjamin Eichinger et al., 2011-0127862, Jun. 2, 2011.
Konrad Brandl et al., U.S. Pat. No. 8,519,580, Aug. 27, 2013, 2011-0140550, Jun. 16, 2011.

* cited by examiner

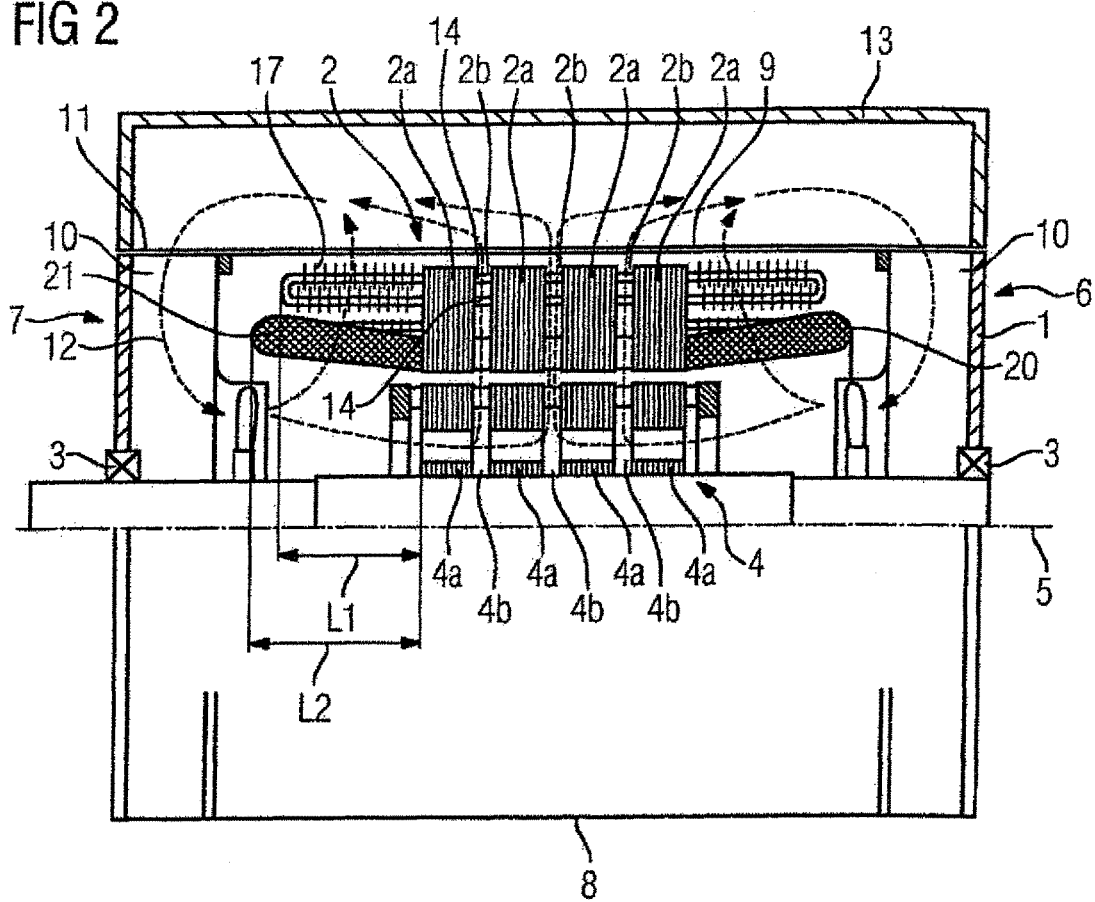
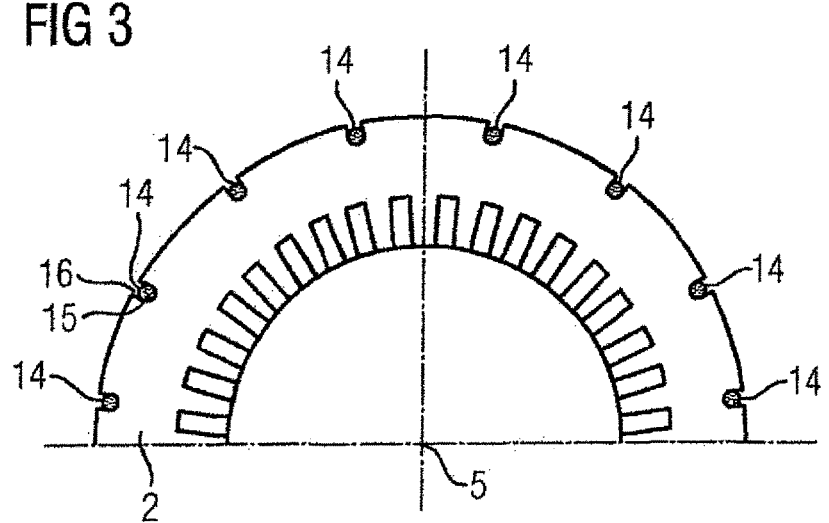

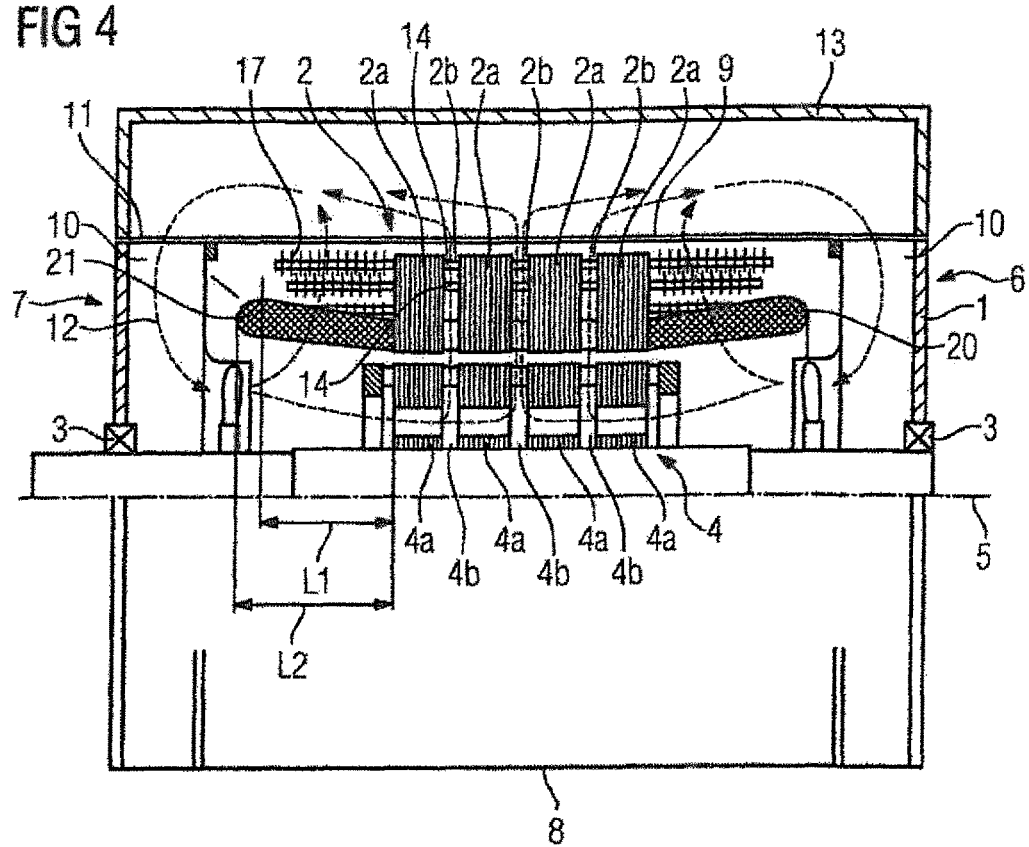

ELECTRIC MACHINE WITH COMBINED AIR AND WATER COOLING

CROSS-REFERENCES TO RELATED APPLICATIONS

This application is the U.S. National Stage of International Application No. PCT/EP2013/074812, filed Nov. 27, 2013, which designated the United States and has been published as International Publication No. WO 2014/086627 and which claims the priority of European Patent Application, Serial No. 12195465.5, filed Dec. 4, 2012, pursuant to 35 U.S.C. 119(a)-(d).

BACKGROUND OF THE INVENTION

The present invention relates to an electric machine,
wherein the electric machine has a housing in which a stator is disposed and in which a rotor is rotatably mounted about an axis of rotation,
wherein the housing extends from a front end to a rear end, viewed in the direction of the axis of rotation,
wherein the housing either has an air inlet opening near the front end and an air outlet opening near the rear end, or has an air inlet opening near the front end and rear end and, therebetween, an air outlet opening on a side parallel to the axis of rotation,
wherein during operation the electric machine aspirates air at the air inlet openings and expels the aspirated air at the air outlet opening,
wherein an attachment is mounted on the side of the housing parallel to the axis of rotation, said attachment covering the air inlet openings and the air outlet opening in the manner of a hood so that the air expelled from the housing at the air outlet opening is returned to the air inlet openings.

Electric machines of this kind are well known. Reference is made to DE 37 24 186 A1 purely by way of example.

In the case of electric machines of the type mentioned in the introduction, pipes for a gaseous or liquid cooling medium—generally air or water—are usually disposed in the attachment and extract heat from the air cooling the electric machine. Because of the installation space required for the pipes, the attachment generally has to have a considerable overall height. Moreover, although the cooling of the electric machine is efficient, it is not optimum.

SUMMARY OF THE INVENTION

The object of the present invention is to further develop an electric machine of the type mentioned in the introduction such that the cooling is optimized and the electric machine is of more compact construction.

This object is achieved by an electric machine having the features as claimed in the independent claim. Advantageous embodiments of the electric machine are set forth in the dependent claims.

An electric machine of the type mentioned in the introduction is inventively designed such that
pipes for a cooling medium for directly cooling the stator during operation are disposed in the stator, and
at least some of the pipes project beyond the stator toward the front and rear end, viewed in the direction of the axis of rotation, so that during operation they remove heat from the aspirated air flowing inside the housing.

This approach means that the stator can be directly cooled in a highly efficient manner using the liquid cooling medium. The cooling of the rotor is at least as efficient as in the prior art. In addition, the electric machine according to the invention can be of compact design.

Disposed in the stator is a stator winding system which, viewed from the stator in the direction of the axis of rotation, has a front winding head toward the front end and a rear winding head toward the rear end. In a preferred embodiment of the present invention, the pipes cover at least 50%, or better at least 75%, of the winding heads, viewed in the direction of the axis of rotation. In general the pipes do not extend completely over the winding heads. However, in individual cases it is possible for them to extend completely over the winding heads or even beyond the winding heads.

In general the pipes are disposed in an evenly distributed manner viewed about the axis of rotation. It is possible for the pipes to project equidistantly beyond the stator toward the front and rear end such that all the pipes are of equal length irrespective of where they are disposed on the circumference of the stator. Alternatively, it is possible for at least the pipes disposed in the region of the electric machine facing away from the attachment to project less far beyond the stator toward the front and rear end than the pipes disposed in the region of the electric machine facing the attachment.

In general, the aspirated air flowing within the housing flows around the pipes in the areas in which they project beyond the stator toward the front and rear end. In this case cooling fins protruding from the pipes are disposed on the pipes in the regions in which they project beyond the stator toward the front and rear end.

It is also possible for cooling elements to be disposed on the pipes, said cooling elements extending beyond the pipes toward the ends of the housing, viewed in the direction of the axis of rotation. This embodiment can be implemented irrespective of whether or not the aspirated air flowing within the housing flows around the pipes themselves and whether cooling fins are disposed on the pipes.

It is also possible for the pipes to be interconnected at their axial extremities via a respective ring manifold. In this case cooling elements extending, viewed in the direction of the axis of rotation, beyond the ring manifolds to the ends of the housing can be disposed on the ring manifolds.

In a particularly preferred embodiment of the electric machine it is provided that
the rotor has at least one longitudinal cooling air duct which extends in the direction of the axis of rotation and from which, viewed in the direction of the axis of rotation, rotor-side transverse cooling air ducts extending radially with respect to the axis of rotation branch radially outward at predetermined axial positions,
viewed in the direction of the axis of rotation between the predetermined axial positions, the stator has a stator section in each case and stator-side transverse cooling air ducts extending radially with respect to the axis of rotation at the predetermined axial positions, and
the air aspirated at the air inlet openings during operation flows within the housing at least partly into the at least one longitudinal cooling air duct in the direction of the axis of rotation and then flows radially outward through the rotor-side transverse cooling air ducts and the stator-side transverse cooling air ducts.

This design enables in particular the cooling effect to be optimized.

BRIEF DESCRIPTION OF THE DRAWING

The above described characteristics, features and advantages of the invention and the way in which they can be achieved will become clearer and more readily comprehensible in conjunction with the following description of exemplary embodiments which will be explained in greater detail with reference to the accompanying schematic drawings in which:

FIGS. 1 and 2 show embodiments of an electric machine in longitudinal section, FIG. 3 shows a stator in cross-section, and FIG. 4 shows differences in the axial lengths of the pipes of the electric machine.

DETAILED DESCRIPTION OF PREFERRED EMBODIMENTS

Figure 1:
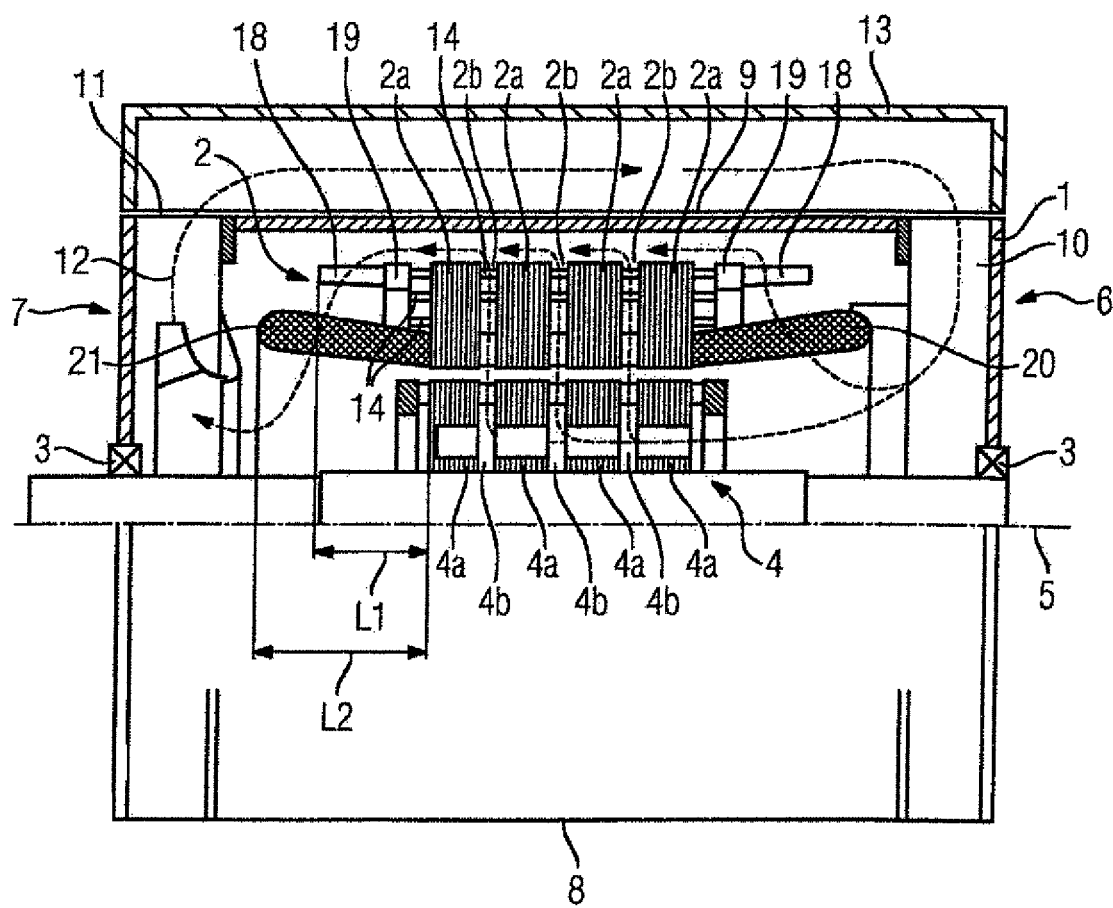

According to FIGS. 1 and 2, an electric machine has a housing 1. Disposed in the housing 1 is a stator 2. In the housing 1 a rotor 4 is additionally mounted in bearings 3 so that the rotor 4 is rotatable about an axis of rotation 5. The housing extends from a front end 6 to a rear end 7, viewed in the direction of the axis of rotation 5. Its underside 8 rests on a base (not shown).

The axis of rotation generally runs horizontally. The following description relates to these embodiments. However, in individual cases the axis of rotation could alternatively run vertically.

The rotor preferably has at least one longitudinal cooling air duct 4a. The longitudinal cooling air duct 4a extends in the direction of the axis of rotation 5. At predetermined axial positions—i.e. at predetermined positions viewed in the direction of the axis of rotation 5—rotor-side transverse cooling air ducts 4b branch off radially outward from the (at least one) longitudinal cooling air duct 4a. The transverse cooling air ducts 4b extend radially to the axis of rotation 5. They are radially open to the outside, i.e. toward the stator 2. The stator 2 also has stator-side transverse cooling air ducts 2b at the predetermined axial positions. The stator-side transverse cooling air ducts 2b extend radially with respect to the axis of rotation 5. Between the predetermined axial positions, the stator 2 has a stator section 2a in each case.

It is possible for the housing 1 to have a (single) air inlet opening 10 and an air outlet opening 11. In this case the air inlet opening 10 is disposed near the front end 6, the air outlet opening 11 near the rear end 7. The air inlet opening 10 and the air outlet opening 11 are usually disposed on an upper side 9 of the housing 1 (i.e. generally on a side 9 parallel to the axis of rotation 5) in this case. However, in individual cases they can be disposed on the lateral sides of the housing 1. This embodiment is shown in FIG. 1. Alternatively, it is possible for the housing 1 to have two air inlet openings 10 and one air outlet opening 11 on the upper side 9. In this case, one of the air inlet openings 10 is disposed near the front end 6 and one near the rear end 7. The air outlet opening 11 is in this case disposed between the two air inlet openings 10. This embodiment is illustrated in FIG. 2. In this case the air inlet openings 10 are also usually disposed on the upper side 9, i.e. on the side 9 parallel to the axis of rotation 5. However, in individual cases they can be disposed on the lateral sides of the housing 1. The air outlet opening 11 is always disposed on the upper side 9, i.e. the side 9 parallel to the axis of rotation 5.

The term air inlet openings 10 (in the plural) will now be used. This is merely a generic usage. The corresponding description therefore applies equally to embodiments according to FIG. 1 having a single air inlet opening 10.

Irrespective of which of the two embodiments (having a single air inlet opening 10 or having two air inlet openings 10) is implemented, during operation the electric machine aspirates air at the air inlet openings 10, conveys it through the housing 1 (in particular through the stator 2 and the rotor 4) and expels the air again at the air outlet opening 11. The respective air circulations are indicated by dashed lines 12 in FIGS. 1 and 2. It can be seen in particular from FIGS. 1 and 2 that, inside the housing 1, the air aspirated at the air inlet openings 10 during operation of the electric machine flows (at least partially) in the direction of the axis of rotation 5 into the at least one longitudinal cooling air duct 4a and then flows radially outward through the rotor-side transverse cooling air ducts 4b and the stator-side transverse cooling air ducts 2b.

An attachment 13 is additionally mounted on the upper side 9, i.e. the side 9 of the housing 1 parallel to the axis of rotation 5. The attachment 13 covers the air inlet openings 10 and the air outlet opening 11 in the manner of a hood. The attachment 13 causes air that is expelled at the air outlet opening 11 to be fed back to the air inlet openings 10. The air therefore circulates in a closed cooling loop. It cools the rotor 4 and partially also the stator 2 by convection.

Pipes 14 are disposed in the stator 2—this applies to both the embodiment according to FIG. 1 and the embodiment according to FIG. 2. The pipes 14 run, as shown in FIGS. 1 and 2 and also FIG. 3, in the direction of the axis of rotation 5. Alternatively, they could exhibit a slight twist about the axis of rotation 5. The pipes 14 convey a liquid cooling medium 15, usually water. During operation of the electric machine, the stator 1 is cooled directly by means of the liquid cooling medium 15, i.e. is directly liquid-cooled. Heat is transferred from the stator 2 to the pipes 14 by thermal conduction. As shown in FIG. 3 the pipes 14 can, for example, be pressed into grooves 16 on the outer circumference of the stator 1. Alternatively or additionally, the pipes 14 can be mounted in bores.

As shown in FIGS. 1 and 2, the pipes 14—at least some of the pipes 14—project beyond the stator 2 toward the front end 6 and the rear end 7, viewed in the direction of the axis of rotation 5. This enables the pipes 14 to remove heat from the air aspirated through the air inlet openings and flowing inside the housing 10 during operation of the electric machine.

In the simplest case, the air flowing inside the housing 1 is conveyed for this purpose such that the air flows around the pipes 14 in the areas in which the pipes 14 project beyond the stator 2 toward the front end 6 and the rear end 7. Particularly in this case, cooling fins 17 protruding from the pipes 14 can be disposed on the pipes 14 in the areas in which they project beyond the stator 2 toward the front end 6 and the rear end 7. The cooling fins 17 can, for example, be clipped onto the pipes 14.

Alternatively or additionally to the air flowing inside the housing 1 flowing directly around the pipes 14, cooling elements 18 can be disposed on the pipes 14. The cooling elements 18 extend in this case beyond the pipes 14 toward the ends 6, 7 of the housing, viewed in the direction of the axis of rotation 5.

As shown in FIG. 1, it is possible for the pipes 14 to have U-shaped segments so that, in a first section of the pipes 14, the cooling medium 15 flows in the direction from the front end 6 toward the rear end 7 and, in a second section of the pipes 14, in the direction from the rear end 7 toward the front end 6. It is alternatively possible, as illustrated in FIG. 2, for the pipes 14 to be connected on both sides of the stator 2—i.e. at their axial extremities—by means of a respective ring manifold 19. If the cooling elements 18 are present in this case, they are disposed on the ring manifolds 19 as shown in FIG. 2.

A stator winding system is disposed in the stator 2. The stator winding system as such is not visible in FIGS. 1 and 2, as it is hidden by the stator 2. The stator winding system has a front winding head 20 and a rear winding head 21. The winding heads 20, 21 are shown in FIGS. 1 and 2. The front winding head 20 extends from the stator 2 toward the front end 6, viewed in the direction of the axis of rotation 5. Similarly, the rear winding head 21 extends from the stator 2 toward the rear end 7, viewed in the direction of the axis of rotation 5. As shown in FIGS. 1 and 2, the pipes 14 cover at least 0.50% of winding heads 20, 21, viewed in the direction of the axis of rotation 5. Preferably they even cover at least 75% of the winding heads 20, 21. The degree of coverage relates to the ratio of the axial length L1 of the overlap of the pipes 14 beyond the stator 2 to the overlap L2 of the winding heads 20, 21 beyond the stator 2.

In general, the pipes 14 do not completely cover the winding heads 20, 21, viewed in the direction of the axis of rotation 5. However, complete coverage or even extension beyond the winding heads 20, 21 may be possible in individual cases.

As shown in FIG. 3, the pipes 14 are preferably evenly distributed, viewed about the axis of rotation 5 and FIG. 4 shows the axial lengths of the pipes 14. It is possible for the pipes 14 to project equidistantly beyond the stator 2 toward the front end 6 and the rear end 7. This embodiment is particularly advantageous if the ends of the pipes 14 are connected by means of the ring manifolds 19. Alternatively, it is possible for at least the pipes 14 disposed in the lower area, i.e. broadly in the area of the electric machine facing away from the attachment 13, to project less far beyond the stator 2 toward the front end 6 and the rear end 7 than the pipes 14 disposed in the upper area of the electric machine, i.e. broadly in the area facing the attachment 13.

The present invention has many advantages. In particular, it provides a simple means of implementing compact combined water and air cooling of an electric machine. Increased efficiency is also possible.

Although the invention has been described and illustrated in detail by the preferred exemplary embodiment, the invention is not limited by the examples disclosed and other variations may be inferred therefrom by the average person skilled in the art without departing from the scope of protection sought for the invention.

What is claimed is:

1. An electric machine, comprising:
    a housing having a front end and a rear end, said housing having at least one air inlet opening near one of the front and rear ends of the housing for aspirating air, and an air outlet opening for expelling air;
    a stator disposed in the housing;
    a rotor mounted in the housing for rotation about an axis of rotation;
    an attachment mounted on a side of the housing in parallel relation to the axis of rotation and configured to cover the air inlet and outlet openings in the manner of a hood so that air expelled from the housing through the air outlet opening is fed back to the air inlet opening;
    straight pipes disposed in the stator for flow of a liquid cooling medium to directly cool the stator during operation, at least some of the pipes configured to project beyond the stator toward the front and rear ends, as viewed in a direction of the axis of rotation, so that during operation heat is removed by the pipes from air flowing in the housing; and
    a stator winding system disposed in the stator, said stator winding system having a front winding head toward the front end and a rear winding head toward the rear end, as viewed from the stator in the direction of the axis of rotation, said pipes covering at least 50% of the front and the rear winding heads, as viewed in the direction of the axis of rotation, wherein a percentage of coverage by the pipes is determined by a ratio of an axial length of an overlap of the pipes beyond the stator, relative to an overlap of the front and the rear winding heads beyond the stator,
    wherein the pipes include a first plurality of the pipes extending exclusively in a direction of the axis of rotation in an area facing away from the attachment and a second plurality of the pipes extending exclusively in a direction of the axis of rotation an area facing the attachment, said pipes of the first plurality of the pipes extending in the direction of the axis of rotation in the area facing away from the attachment projecting less far beyond the stator toward the front and rear ends than the pipes of the second plurality of the pipes extending in the direction of the axis of rotation in the area radially facing the attachment.

2. The electric machine of claim 1, wherein the air inlet opening is provided near the front end, and the air outlet opening is provided near the rear end.

3. The electric machine of claim 1, wherein the housing has two of said air inlet openings, one air inlet opening provided near the front end and one air inlet opening provided near the rear end, said air outlet opening being provided on a side between the front and rear ends.

4. The electric machine of claim 1, wherein the pipes cover at least 75% of the front and rear winding heads.

5. The electric machine of claim 1, wherein the pipes are evenly spaced apart about the axis of rotation and project equidistantly beyond the stator toward the front and rear ends.

6. The electric machine of claim 1, wherein the aspirated air flowing inside the housing flows around the pipes in areas in which the pipes project beyond the stator toward the front and rear ends.

7. The electric machine of claim 1, further comprising cooling fins protruding from the pipes and disposed on the pipes in areas in which the pipes project beyond the stator toward the front and rear ends.

8. The electric machine of claim 1, further comprising cooling elements extending in the direction of the axis of rotation beyond the pipes toward the front and rear ends of the housing and disposed on the pipes.

9. The electric machine of claim 1, further comprising ring manifolds configured to respectively interconnect the pipes at their axial extremities.

10. The electric machine of claim 9, further comprising cooling elements disposed on the ring manifolds and extending in the direction of the axis of rotation beyond the ring manifolds toward the front and rear ends of the housing.

11. The electric machine of claim 1, wherein the rotor has at least one longitudinal cooling air duct, which extends in the direction of the axis of rotation, and rotor-side transverse cooling air ducts, which extend from the at least one longitudinal cooling air duct radially with respect of the axis of rotation and branch off radially outward at predetermined axial positions, wherein the stator has a stator section between the predetermined axial positions and stator-side transverse cooling air ducts extending radially with respect to the axis of rotation at the predetermined axial positions, and wherein air aspirated at the air inlet opening during operation flows inside the housing at feast partially in the direction of the axis of rotation into the at least one longitudinal cooling air duct and then flows radially outward through the rotor-side transverse cooling air ducts and the stator-side transverse cooling air ducts.

\* \* \* \* \*